(12) United States Patent
Bolz

(10) Patent No.: US 7,052,428 B2
(45) Date of Patent: May 30, 2006

(54) ACTUATOR

(75) Inventor: Martin-Peter Bolz, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 10/481,901

(22) PCT Filed: Nov. 5, 2002

(86) PCT No.: PCT/DE02/04094

§ 371 (c)(1),
(2), (4) Date: Dec. 23, 2003

(87) PCT Pub. No.: WO03/078863

PCT Pub. Date: Sep. 25, 2003

(65) Prior Publication Data

US 2004/0149079 A1    Aug. 5, 2004

(30) Foreign Application Priority Data

Mar. 13, 2002   (DE) .................. 102 11 208

(51) Int. Cl.
*F16H 1/28* (2006.01)
(52) U.S. Cl. ..................... 475/149; 475/341
(58) Field of Classification Search ............... 475/149, 475/338, 341; 310/83; 15/250.3, 250.12
See application file for complete search history.

(56) References Cited

U.S. PATENT DOCUMENTS

| | | | | |
|---|---|---|---|---|
| 4,918,344 A | | 4/1990 | Chikamori et al. | |
| 4,994,004 A | * | 2/1991 | Meijer et al. | 475/149 |
| 5,355,743 A | * | 10/1994 | Tesar | 475/149 |
| 5,704,864 A | * | 1/1998 | Yanagisawa | 475/149 |
| 5,711,736 A | * | 1/1998 | Kyodo | 475/149 |
| 5,751,081 A | * | 5/1998 | Morikawa | 310/83 |
| 6,727,614 B1 | * | 4/2004 | Neubauer et al. | 475/149 |

FOREIGN PATENT DOCUMENTS

| | | | |
|---|---|---|---|
| CH | 108 141 A | | 12/1924 |
| DE | 31 12 090 | | 2/1983 |
| DE | 85 13 219 U | * | 5/1986 |
| DE | 40 26 886 A | | 2/1992 |
| DE | 44 12 898 A | | 10/1995 |
| DE | 199 44 915 | | 3/2001 |
| DE | 695 18 814 | | 3/2001 |
| DE | 100 03 350 A1 | | 8/2001 |

* cited by examiner

*Primary Examiner*—Sherry Estremsky
(74) *Attorney, Agent, or Firm*—Michael Best & Friedrich

(57) ABSTRACT

The invention starts from an actuating drive (10) with an electric motor (12), which drives an output shaft (32) via a toothed wheel gear (14) in a planetary design, which includes a first housing-mounted central wheel (16) and a second rotatable central wheel (18), whereby both central wheels (16, 18) each form gear steps with different step-down ratios with at least one planet wheel (20, 22) and the planet wheel (20) belonging to the first central wheel (16) is connected to the planet wheel (22) belonging to the second central wheel (18) in a torque-proof manner. It is proposed that the electric motor (12) drive a planet carrier (26) on which the planet wheels (20, 22) are pivoted.

Figure 1:
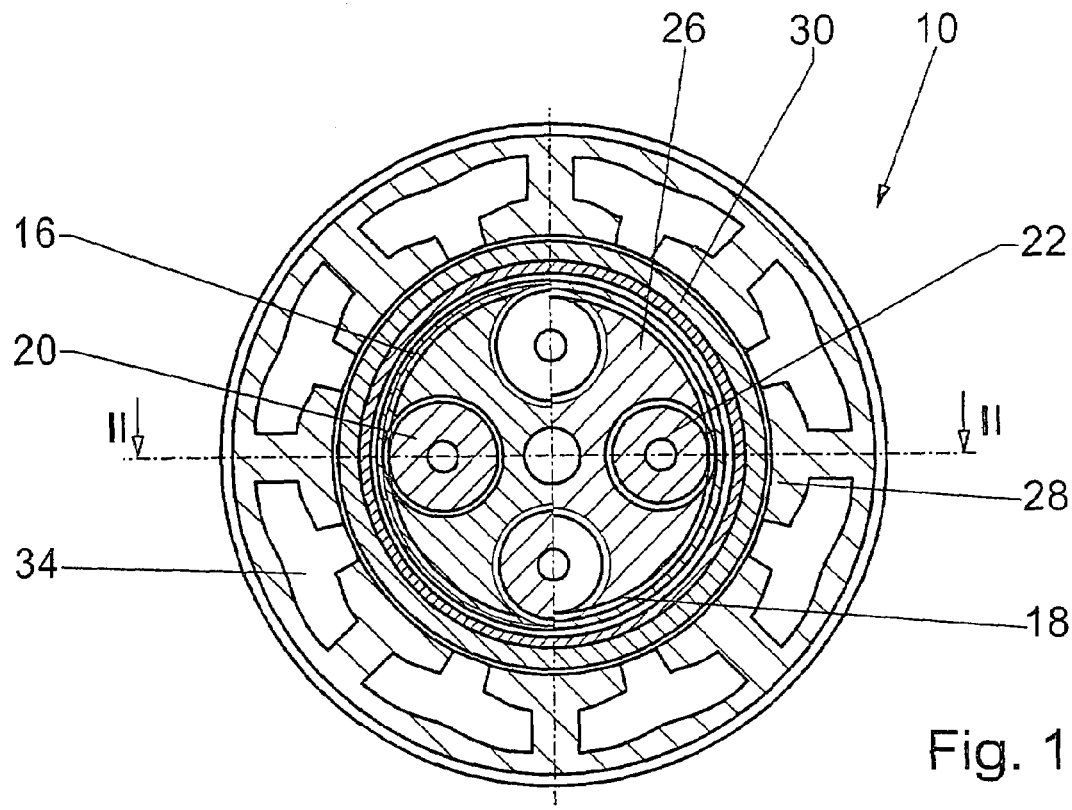

10 Claims, 1 Drawing Sheet great power
ACTUATOR

Priority is hereby claimed to international patent application no. PCT/DE02/04094 filed on Nov. 5, 2002, and German Patent Application No. 102 11 208.8 filed on Mar. 13, 2002, the entire contents of which are incorporated herein by reference.

In principle, there is a desire for increasingly powerful and more compact actuating drives. In the motor vehicle industry these drives are used, e.g., to drive windshield wipers, window lifters, seats, sliding roofs or the like. Actuating drives that generate a very high torque and need to be housed in an extremely confined construction space are required in particular for double-motor wiper systems. The goal is creating, e.g., an actuating drive with a construction volume of approx. 500 $cm^3$, which generates an output torque of 35 Nm with a reversible electric motor with 60 cycles per second.

An adjusting apparatus to adjust a second part vis-á-vis a first part, in particular to adjust articulated parts such as the articulated parts of robots, is known from DE 100 03 350 A1.

The apparatus includes an electric motor, e.g., a high-speed electric motor having a small construction size with a low torque, which adjusts the first component towards the second component via a planet gear with a high step-down ratio. The planet gear is embodied as a reduced coupled gear, which is also called a Wolfrom gear for short. It has two central wheels, which are embodied as internal geared wheels with internal toothing, and each mesh with planet wheels having corresponding external toothing. A central wheel is permanently connected to the first component, while the other central wheel is permanently connected to the second component and pivoted relative to the first central wheel. As a rule, the first component is stationary by being connected for example to a housing part of the electric motor. The first central wheel forms a first gear step with the planet wheels that are allocated to it, while the second central wheel forms a second gear step with the planet wheels allocated to it. The planet wheels of both gear steps are each connected to one another so they are torque-proof. The motor shaft of the electric motor drives one of the gear steps via a sun wheel. The selection of the gear ratios of the gear steps can be used to achieve that the output of the actuating drive has the same or an opposite direction of rotation relative to the drive. In addition, self-locking is produced from a high step-down ratio of the known planet gear in connection with a corresponding degree of efficiency so that torque can be transmitted namely from the drive to the output, but not, however, in the opposite direction from the output to the drive.

Moreover, these types of planet gears are known from VDI Report 672, German Association of Engineers, "Planet Gears, a Powerful Component of Motive Power Engineering", VDI Publishers 1988. Planet gears with self-locking capability are shown on pages 146 and 147 in FIG. 2 and FIG. 3 and the conditions for self-locking are defined under item 3 on page 147.

Moreover, a slow-speed servo drive for robots and similar types of automatically controllable machines is known from U.S. Pat. No. 4,918,344. The driving motor includes, e.g., a direct current motor, an alternating current motor, direct drive motor or stepper motor, which works together with a highly reducing planet gear. The planet gear is a frictional planet gear in which the torques between the gear elements, the central wheels and the planet wheels are transmitted adherently via friction. The central wheels and the planet wheels are embodied as rollers. Due to slippage between the gear elements, a clear allocation of the adjusting movement on the drive to the adjusting movement on the output is not guaranteed.

The planet gear, which is designed to be compact and light, is at least partially accommodated within a hollow cylindrical rotor of the electric motor. Via a disk, the rotor drives a sun wheel of a first gear step whose planet wheels have an adherent connection with the sun wheel and a first internal geared wheel, which is connected with the housing of the electric motor in a torque-proof manner. A planet carrier, on which the planet wheels of the first gear step are pivoted, is coupled with another sun wheel, which, with corresponding planet wheels and a second internal geared wheel, belongs to a second gear step. A second planet carrier, on which the planets of the second gear step are pivoted, is coupled with the output shaft of the actuating drive, while the planet wheels are adherently supported on the second housing-mounted internal geared wheel. The planet gear, which can also be embodied as a single-stage gear, does not have self-locking.

ADVANTAGES OF THE INVENTION

According to the invention, the electric motor drives a planet carrier, on which the planet wheels of the two gear steps that are connected to each other in a torque-proof manner are pivoted. The planet wheels mesh with two central toothed wheels, which basically can be embodied as externally toothed sun wheels, but are preferably internally toothed, internal geared wheels. Of the two central wheels a first one is permanently connected to a housing of the electric motor, while the second central wheel is arranged rotatably and is coupled with the output shaft. The gear steps that are formed by the central wheels and the allocated planet wheels have a slightly different step-down ratio so that a high total reduction ratio is produced overall. Despite this, the planet gear has a better degree of efficiency as compared to other highly reducing gears, such as worm gears, without having to sacrifice the self-locking of the gear.

Since the planet gear has an essentially rotationally symmetrical structural shape, it can be integrated favorably into an electric motor by its planet carrier being connected to a rotor of the electric motor in a torque-proof manner thereby expediently forming a structural unit with it. The central wheels, which are embodied as internal geared wheels, are arranged on both sides of a wheel disk of the planet carrier, which is pivoted with a hub on the output shaft. In order to achieve a short axial structural length, it is advantageous if the central wheels are at least partially axially overlapped by a jacket (embodied as a reflux ring) of the planet carrier, on which the rotor of the electric motor is arranged.

This type of actuating drive in accordance with the invention is suitable particularly in connection with an electronically commutated direct current motor to drive a windshield wiper of a motor vehicle since it only occupies a small installation space while providing great power density and self-locking. Self-locking is guaranteed, for example, if:

the gear is a simple 3-shaft planet gear with a driven planet carrier and a fixed sun wheel (internal geared wheel or spur wheel), the housing and the output both feature either internal toothing or external toothing, because different operational signs of the torques are generated in the planetary axle as a result, and the torques that act on the planetary axle during the driving of the output side almost balance each other out or the torque acting against the direction of force is greater than the torque acting with the dynamic effect.

DRAWINGS

Figure 2:
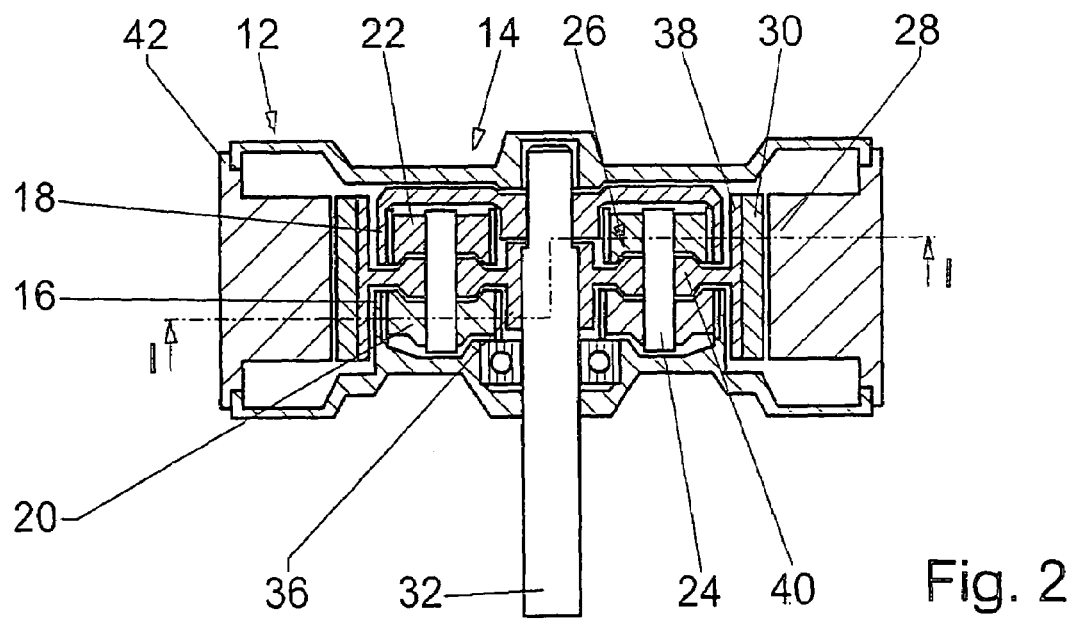

Additional advantages are yielded from the following description of the drawings. An exemplary embodiment of the invention is depicted in the drawings. The drawings, the description and the claims contain numerous features in combination. The expert will also observe individual features expediently and combine them into additional, meaningful combinations. The drawings show:

FIG. 1 A cross-section in accordance with Line I—I in FIG. 2.

FIG. 2 A longitudinal section in accordance with Line II—II in FIG. 1.

DESCRIPTION OF THE EXEMPLARY EMBODIMENT

An actuating drive 10 includes an electric motor 12, preferably an electronically commutated direct current motor, with a stator 28 and a rotor 30. Spaces 34 for windings are provided in the stator 28. The windings are energized in the normal manner via a control unit that is not shown in greater detail.

A toothed wheel gear 14 in a planetary design, called a planet gear for short, is housed inside the essentially hollow cylindrical rotor 30. It includes a planet carrier 26, which features a jacket 38 and a wheel disk 40 and is pivoted by means of a hub 36 on an output shaft 32. The jacket 38 of the planet carrier 26 is connected to the rotor 30 in a torque-proof manner and expediently forms a structural unit with it. It covers at least partially two central wheels 16, 18, which are similarly embodied, namely as internal geared wheels. A first central wheel 16 is connected with a housing part 42 of the electric motor 12 in a torque-proof manner, while a second central wheel 18 is coupled with the output shaft 32.

Planet wheels 20 and 22 are pivoted on the planet carrier 26 by means of planetary axles 24. The planet wheels 20, four of which are each distributed over the circumference, form a first gear step with the first central wheel 16, while the planet wheels 22 form a second gear step with the second central wheel 18 in the same way. A planet wheel 22 of the second gear step is allocated to each of the planet wheels 20 of the first gear step. The planet wheels 20, 22 that are allocated to one another are connected to one another in a torque-proof manner. The step-down ratios of the two gear steps differ slightly in that the two central wheels 16, 18 and/or the associated planet wheels 20, 22 have different numbers of teeth so that a high step-down ratio of the planet gear 14 is produced overall.

Driving the actuating drive 10 is accomplished via the rotor 30 of the electric motor 12 on the planet carrier 26 of the planet gear 14, whereby the planet wheels 20 roll in the stationary first central wheel 16 and, in doing so, drive the planet wheels 22. They drive for their part the second central wheel 18, which is connected with the output shaft 32 in a torque-proof manner.

It is also possible in principle that the second central wheel 18 be permanently connected to a housing part 42, while the first central wheel 16 sits on the output shaft 32 in a torque-proof manner. By a corresponding selection of the step-down ratios for the gear steps, the total reduction ratio of the planet gear 14 can be varied in wide limits without the degree of efficiency of the planet gear 14 deteriorating appreciably or the self-locking being lost. The relationships between the gear ratios, the degree of efficiency and the self-locking are described for comparable planet gears, e.g., in design books, Volume 26, "Toothed Wheel Gear", Johannes Looman, Springer-Verlag, Berlin 1970, pages 26 through 31.

The invention claimed is:

1. Actuating drive (10) with an electric motor (12), which drives an output shaft (32) via a toothed wheel gear (14) in a planetary design, which includes a first housing-mounted central wheel (16) and a second rotatable central wheel (18), whereby both central wheels (16, 18) form gear steps with different step-down ratios with respective associated planet wheels (20, 22) and the planet wheel (20) associated with the first central wheel (16) is connected to the planet wheel (22) associated with the second central wheel (18) in a torque-proof manner, characterized in that the electric motor (12) drives a planet carrier (26) on which the planet wheels (20, 22) are pivoted, and that the two central wheels (16, 18) are internal geared wheels, between which a wheel disk (40) of the planet carrier (26) is arranged, with a hub (36) positioned on the output shaft (32) and having a cylindrical jacket (38) on the outer circumference on which a rotor (30) of the electric motor (12) sits.

2. Actuating drive (10) according to claim 1, characterized in that the step-down ratios of the gear steps are selected in such a way that the planet gear (14) features self-locking.

3. Actuating drive (10) according to claim 2, characterized in that the electric motor (12) is an electronically commutated direct current motor.

4. Actuating drive (10) according to claim 2, characterized in that it serves to drive a windshield wiper of a motor vehicle.

5. Actuating drive (10) according to claim 1, characterized in that the central wheels (16, 18) overlap axially at least partially with the jacket (38).

6. Actuating drive (10) according to claim 5, characterized in that the electric motor (12) is an electronically commutated direct current motor.

7. Actuating drive (10) according to claim 5, characterized in that it serves to drive a windshield wiper of a motor vehicle.

8. Actuating drive (10) according to claim 1, characterized in that the electric motor (12) is an electronically commutated direct current motor.

9. Actuating drive (10) according to claim 1, characterized in that it serves to drive a windshield wiper of a motor vehicle.

10. Actuating drive (10) according to claim 9, characterized in that the electric motor (12) is an electronically commutated direct current motor.

* * * * *